(12) United States Patent
Hirasawa et al.

(10) Patent No.: US 10,272,513 B2
(45) Date of Patent: Apr. 30, 2019

(54) FERRITIC STAINLESS STEEL SHEET FOR PLASMA ARC WELDING AND WELDING METHOD THEREFOR

(71) Applicant: JFE STEEL CORPORATION, Tokyo (JP)

(72) Inventors: Junichiro Hirasawa, Chiba (JP); Shin Ishikawa, Chiba (JP); Chikara Kami, Kawasaki (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 15/329,856

(22) PCT Filed: May 12, 2015

(86) PCT No.: PCT/JP2015/002400
§ 371 (c)(1),
(2) Date: Jan. 27, 2017

(87) PCT Pub. No.: WO2016/017053
PCT Pub. Date: Feb. 4, 2016

(65) Prior Publication Data
US 2017/0266751 A1 Sep. 21, 2017

(30) Foreign Application Priority Data
Jul. 31, 2014 (JP) .................................. 2014-155846

(51) Int. Cl.
| | | |
|---|---|---|
| *B23K 10/00* | (2006.01) | |
| *B23K 10/02* | (2006.01) | |
| *C22C 38/00* | (2006.01) | |
| *C22C 38/50* | (2006.01) | |
| *C22C 38/54* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/52* | (2006.01) | |

(52) U.S. Cl.
CPC ............. *B23K 10/02* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01)

(58) Field of Classification Search
CPC ........ B23K 10/02; H05H 1/26; C22C 38/001; C22C 38/002; C22C 38/004; C22C 38/02; C22C 38/04; C22C 38/06; C22C 38/44; C22C 38/46; C22C 38/48; C22C 38/50; C22C 28/52; C22C 38/54
USPC ............. 219/121.45, 121.46, 121.59, 137 R, 219/121.64
See application file for complete search history.

(56) References Cited

U.S. PATENT DOCUMENTS

| | | | | |
|---|---|---|---|---|
| 9,586,293 | B2 * | 3/2017 | Wada | .................... B23K 35/383 |
| 2011/0290383 | A1 * | 12/2011 | Yoshida | ................. C21D 6/005 148/603 |
| 2013/0129560 | A1 * | 5/2013 | Matsuhashi | .......... C21D 8/0226 420/41 |
| 2013/0193116 | A1 | 8/2013 | Wada | |
| 2015/0292068 | A1 * | 10/2015 | Teraoka | .................. C22C 38/00 148/605 |

FOREIGN PATENT DOCUMENTS

| | | |
|---|---|---|
| CN | 102471841 A | 5/2012 |
| EP | 2312007 A1 | 4/2011 |
| EP | 2474635 A1 | 7/2012 |
| JP | 11256281 | 9/1999 |
| JP | 2001150141 | 6/2001 |
| JP | 2006263811 | 10/2006 |
| JP | 2007290033 | 11/2007 |
| JP | 2009091654 | 4/2009 |
| JP | 2012081480 | 4/2012 |
| KR | 20130070751 A | 6/2013 |

(Continued)

OTHER PUBLICATIONS

Chinese Office Acton for Chinese Application No. 201580041326.1, dated Oct. 31, 2017 with Concise Statement of Relevance, 8 pages.
International Search Report and Written Opinion for International Application No. PCT/JP2015/002400, dated Jun. 16, 2015, 6 pages.
Taiwanese Office Action for Taiwanese Application No. 104124719, dated Feb. 25, 2016, with Concise Statement of Relevance of Office Action—4 Pages.
Korean Office Action for Korean Application No. 10-2017-7002374, dated Apr. 25, 2018, including Concise Statement of Relevance of Office Action, 6 pages.
Chinese Office Action for Chinese Application No. 201580041326.1, dated Aug. 1, 2018, with Concise Statement of Relevance of Office Action, 6 pages.

(Continued)

*Primary Examiner* — Mark Paschall
(74) *Attorney, Agent, or Firm* — RatnerPrestia

(57) ABSTRACT

The ferritic stainless steel sheet contains, in mass%, C: 0.020% or less, Si: 0.6% or less, Mn: 0.5% or less, P: 0.04% or less, S: 0.010% or less, Al: 0.015% or more and 0.20% or less, Cr: 17.0% or more and 24.0% or less, Ni: less than 0.6%, N: 0.020% or less, Ca: 0.0002% or more and 0.0020% or less, and O: 0.0050% or less and further contains one or two selected from Ti: 0.01% or more and 0.45% or less and Nb: 0.01% or more and 0.55% or less, with the balance being Fe and unavoidable impurities. The ferritic stainless steel sheet satisfies $(Ti+Nb\times 48/93)/(C+N)\geq 8.0$ (where Ti, Nb, C, and N represent the contents (% by mass) of these elements, respectively).

12 Claims, No Drawings

(56) References Cited

FOREIGN PATENT DOCUMENTS

KR        101359249  B1    2/2014
TW        201012945  A     4/2010

OTHER PUBLICATIONS

Korean Office Action for Korean Application No. 10-2017-7002374, dated Nov. 22, 2018 with Concise Statement of Relevance of Office Action. 6 pages.
Chinese Office Action for Chinese Application No. 201580041326.1, dated Jan. 30, 2019 with Concise Statement of Relevance of Office Action, 5 pages.

* cited by examiner

FERRITIC STAINLESS STEEL SHEET FOR PLASMA ARC WELDING AND WELDING METHOD THEREFOR

CROSS REFERENCE TO RELATED APPLICATIONS

This is the U.S. National Phase application of PCT International Application No. PCT/JP2015/002400, filed May 12, 2015 and claims priority to Japanese Patent Application No. 2014-155846, filed Jul. 31, 2014, the disclosures of these applications being incorporated herein by reference in their entireties for all purposes.

FIELD OF THE INVENTION

The present invention relates to a ferritic stainless steel sheet used for plasma arc welding and to a welding method therefor.

BACKGROUND OF THE INVENTION

Generally, in plasma arc welding, a strong plasma gas flow is used to melt a base metal. Therefore, for butt welding in plasma arc welding, keyhole welding is generally performed to prevent weld defects such as humping beads. Therefore, the depth of penetration is larger than that in TIG welding, and the welding speed is higher. Further, in plasma arc welding, the bead width is small, and this is advantageous in that strain in the base metal is small. The keyhole welding is a method in which welding is performed while a keyhole (small hole) passing through the sheets in their thickness direction is formed by the plasma gas flow. For example, Patent Literature 1 discloses martensitic stainless steel containing 7 to 14 mass % of Cr and controlled amounts of Al, P, S, and O in order to perform melt welding such as plasma arc welding.

As for keyhole welding (hereinafter referred to also as plasma keyhole welding) for stainless steel, keyhole welding has been conventionally used for austenitic stainless steel typified by SUS304. However, austenitic stainless steel has a drawback in that stress corrosion cracking is likely to occur, so that ferritic stainless steel that is less likely to undergo stress corrosion cracking is used in not a few applications. Therefore, there is a need to perform plasma keyhole welding also on ferritic stainless steel.

Patent Literature 2 discloses a welding method in which ferritic stainless steel with a thickness of 3 mm or less is subjected to non-keyhole welding using a plasma arc welding torch. Therefore, this method is not for keyhole welding.

CITATION LIST

Patent Literature

PTL 1: Japanese Unexamined Patent Application Publication No. 11-256281
PTL 2: Japanese Unexamined Patent Application Publication No. 2012-081480

SUMMARY OF THE INVENTION

Ferritic stainless steel has better heat conduction than SUS304 and allows heat to diffuse more easily. Therefore, when arc welding such as TIG welding is performed, it is necessary to increase the amount of heat input. However, when the amount of heat input is increased in plasma keyhole welding, the amount of melt becomes large, so that burn-through may occur.

Aspects of the present invention have been completed to solve the foregoing problem, and an object of aspects of the invention is to provide a ferritic stainless steel sheet in which the occurrence of burn-through is reduced and good weldability by plasma arc welding is achieved.

Solution to Problem

In accordance with aspects of the present invention, to achieve the above object, the components of steel are optimized to prevent burn-through. The present inventors have performed plasma arc welding experiments and examined their details. The inventors have found that the occurrence of burn-through can be suppressed by reducing the amount of O in the steel as much as possible and adding Al or Ca that is easily combined with O to thereby fix O in the form of $Al_2O_3$ or CaO.

This may be because, when the amount of O in the steel is reduced as much as possible and O is fixed in the form of $Al_2O_3$ or CaO, the viscosity of a weld pool becomes high, so that burn-through is less likely to occur. Aspects of the present invention have been completed on the basis of the above findings, and the gist of these aspects are as follows.

[1] A ferritic stainless steel sheet for plasma arc welding, comprising, in mass %, C: 0.020% or less, Si: 0.6% or less, Mn: 0.5% or less, P: 0.04% or less, S: 0.010% or less, Al: 0.015% or more and 0.20% or less, Cr: 17.0% or more and 24.0% or less, Ni: less than 0.6%, N: 0.020% or less, Ca: 0.0002% or more and 0.0020% or less, and O : 0.0050% or less, and
further comprising one or two selected from Ti: 0.01% or more and 0.45% or less and Nb: 0.01% or more and 0.55% or less, with the balance being Fe and unavoidable impurities,
wherein $(Ti+Nb \times 48/93)/(C+N) \geq 8.0$ is satisfied (where Ti, Nb, C, and N represent the contents (% by mass) of these elements, respectively).

[2] The ferritic stainless steel sheet for plasma arc welding according to [1] above, further comprising, in mass %, one or at least two selected from Mo: 0.01% or more and 2.0% or less, Cu: 0.01% or more and 1.0% or less, and Co: 0.01% or more and 0.2% or less.

[3] The ferritic stainless steel sheet for plasma arc welding according to [1] or [2] above, further comprising, in mass %, one or at least two selected from V: 0.01% or more and 0.10% or less, Zr: 0.01% or more and 0.10% or less, and B: 0.00020% or more and 0.0050% or less.

[4] The ferritic stainless steel sheet for plasma arc welding according to any one of [1] to [3] above, wherein the ferritic stainless steel sheet is used for keyhole welding.

[5] A plasma keyhole welding method in which the ferritic stainless steel sheet for plasma arc welding according to any one of [1] to [3] above is used for plasma keyhole welding.

According to aspects of the present invention, the occurrence of burn-through is reduced, and high-quality plasma arc welding can be performed on the ferritic stainless steel sheet.

DETAILED DESCRIPTION OF EMBODIMENTS OF THE INVENTION

The ferritic stainless steel sheet according to aspects of the present invention has a steel composition containing, in mass %, C: 0.020% or less, Si: 0.6% or less, Mn: 0.5% or less, P: 0.04% or less, S: 0.010% or less, Al: 0.015% or more and 0.20% or less, Cr: 17.0% or more and 24.0% or less, Ni: less than 0.6%, N: 0.020% or less, Ca: 0.0002% or more and 0.0020% or less, and O: 0.0050% or less and further containing one or two selected from Ti: 0.01% or more and 0.45% or less and Nb: 0.01% or more and 0.55% or less, with the balance being Fe and unavoidable impurities, wherein $(Ti+Nb \times 48/93)/(C+N) \geq 8.0$ is satisfied (where Ti, Nb, C, and N represent the contents (% by mass) of these elements, respectively). The ferritic stainless steel sheet according to aspects of the present invention is excellent in corrosion resistance.

The ferritic stainless steel sheet according to aspects of the present invention is used for plasma arc welding. Since high-quality plasma arc welding can be performed on the ferritic stainless steel sheet in accordance with aspects of the present invention, the ferritic stainless steel sheet can be used for plasma keyhole welding.

A description will be given of the reasons for the limitations on the chemical composition of the ferritic stainless steel sheet in accordance with aspects of the present invention (hereinafter referred to as a "steel sheet of the present invention"). "%" for each of the components of a steel sheet of the present invention is "% by mass" unless otherwise mentioned.

C: 0.020% or Less

C is an element that causes deterioration in the workability and toughness of the steel sheet. If the content of C exceeds 0.020%, its adverse effect becomes significant. Therefore, the content of C is limited to 0.020% or less. Particularly, from the viewpoint of improvement in the workability and toughness, the content of C is preferably 0.017% or less. More preferably, the content of C is 0.012% or less.

Si: 0.6% or Less

Si is an element necessary as a deoxidizer. The effect of Si is obtained when it is contained in an amount of 0.01% or more. Therefore, the content of Si is preferably 0.01% or more. However, if the content of Si exceeds 0.6%, Si is oxidized during annealing, and a $SiO_2$ coating is formed on the surface of the steel sheet, causing deterioration in pickling performance. Therefore, the content of Si is 0.6% or less. From the viewpoint of improvement in the pickling performance, the content of Si is more preferably 0.30% or less.

Mn: 0.5% or Less

Mn is an element necessary as a deoxidizer. The effect of Mn is obtained when it is contained in an amount of 0.01% or more. Therefore, the content of Mn is preferably 0.01% or more. However, if the content of Mn exceeds 0.5%, the workability of the steel sheet deteriorates. Therefore, the content of Mn is 0.5% or less. From the viewpoint of improvement in the workability, the content of Mn is more preferably 0.30% or less.

P: 0.04% or Less

P is an element that causes deterioration in the workability and toughness of the steel sheet. It is preferable that the content of P is as small as possible. The content of P is 0.04% or less.

S: 0.010% or Less

S is an element that causes deterioration in the toughness. It is preferable that the content of S is as small as possible, and the content of S is 0.010% or less. From the viewpoint of improvement in the toughness, the content of S is preferably 0.007% or less.

Al: 0.015% or More and 0.20% or Less

Al is necessary for improvement of weldability by plasma arc welding, which is a feature of aspects of the present invention. If the content of Al is less than 0.015%, the amount of O that is not fixed in the form of $Al_2O_3$ or CaO in the steel becomes large, so that the occurrence of burn-through cannot be suppressed. Therefore, the content of Al is 0.015% or more. From the viewpoint of suppressing the occurrence of burn-through, the content of Al is preferably 0.020% or more. However, if the content of Al is excessively large, an excessively large amount of $Al_2O_3$ inclusions are generated, and scabs etc. are formed, causing deterioration in the surface quality of the steel sheet. Therefore, the content of Al is limited to 0.20% or less. From the viewpoint of improvement in the surface quality, the content of Al is preferably 0.15% or less.

Cr: 17.0% or More and 24.0% or Less

Cr is an elemental component effective in improving corrosion resistance, and the content of Cr must be 17.0% or more in order to obtain sufficient corrosion resistance. From the viewpoint of improvement in the corrosion resistance, the content of Cr is preferably 20.5% or more. Cr causes deterioration in the toughness of the steel sheet. Particularly, when the content of Cr exceeds 24.0%, the deterioration in the toughness becomes significant, so that the content of Cr is limited to 24.0% or less. From the viewpoint of improvement in the toughness, the content of Cr is preferably 22.0% or less.

Ni: Less than 0.6%

Ni has the effect of improving the corrosion resistance and toughness. However, since its raw material cost is high, the content of Ni is less than 0.6%. From the viewpoint of the corrosion resistance and toughness, the content of Ni is preferably 0.10% or more. If the content of Ni exceeds 0.40%, the effect of improving the corrosion resistance is saturated. Therefore, from the viewpoint of economy, the content of Ni is preferably 0.40% or less.

N: 0.020% or Less

N is an element that causes deterioration in the workability and toughness of the steel sheet, as does C. If the content of N exceeds 0.020%, its adverse effect becomes significant, so that the content of N is limited to 0.020% or less. Particularly, from the viewpoint of improvement in the workability and toughness, the content of N is preferably 0.015% or less and more preferably 0.012% or less.

Ca: 0.0002% or More and 0.0020% or Less

Ca is necessary in order to improve the weldability by plasma arc welding, which is a feature of aspects of the present invention. If the content of Ca is less than 0.0002%, the amount of O that is not fixed in the form of $Al_2O_3$ or CaO in the steel becomes large, so that the occurrence of burn-through cannot be suppressed. Therefore, the content of Ca is 0.0002% or more and preferably 0.0005% or more. However, if the content of Ca exceeds 0.0020%, the effect of Ca is saturated. Rather, in this case, Ca inclusions are formed, so that scabs occur, causing deterioration in the surface quality of the steel sheet. Therefore, the content of Ca is 0.0020% or less. From the viewpoint of improvement in the surface quality, the content of Ca is preferably 0.0015% or less.

One or Two Selected from Ti: 0.01% or More and 0.45% or Less and Nb: 0.01% or More and 0.55% or Less A steel sheet of the present invention contains, as an essential component, at least one of Ti and Nb. Ti and Nb form carbonitrides and therefore have the effect of suppressing a sensitization phenomenon, i.e., deterioration in the corrosion resistance that occurs when Cr is combined with carbon or nitrogen. Therefore, the contents of Ti and Nb in the steel sheet should satisfy $$(Ti+Nb\times 48/93)/(C+N)\geq 8.0 \quad (1)$$

(in formula (1), Ti, Nb, C, and N represent the contents (% by mass) of these elements, respectively). If the contents of Ti and Nb are excessively large, the effect of suppressing the sensitization is saturated. Rather, in this case, deterioration in the toughness occurs. Therefore, the content of Ti is 0.45% or less, and the content of Nb is 0.55% or less. Particularly, from the viewpoint of improvement in the toughness, the content of Ti is preferably 0.35% or less, and the content of Nb is preferably 0.45% or less. From the viewpoint of suppressing the sensitization, it is necessary to satisfy formula (1). In addition, when Ti is contained, the content of Ti is 0.01% or more and preferably 0.20% or more. When Nb is contained, the content of Nb is 0.01% or more and preferably 0.10% or more. From the viewpoint of suppressing the sensitization, it is preferable that the left side of formula (1) above is calculated to be 12.0 or more.

O: 0.0050% or Less

It is essential that the amount of O in the steel be reduced, in order to obtain the effect of reducing the occurrence of burn-through in accordance with aspects of the present invention. When the content of O is 0.0050% or less, the effect of reducing the occurrence of burn-through can be obtained. When the content of O is 0.0040% or less, the effect becomes large. When the content of O is 0.0030% or less, the effect becomes larger.

In steel sheets of the present invention, the balance other than the components described above is Fe and unavoidable impurities.

In accordance with aspects of the present invention, Mo, Cu, Co, V, Zr, and B are not essential components but may be contained within the following ranges.

Mo: 0.01% or More and 2.0% or Less

Mo is an element effective in improving the corrosion resistance and may be optionally contained. When the content of Mo is 0.01% or more, its effect can be obtained. From the viewpoint of improvement in the corrosion resistance, the content of Mo is preferably 0.40% or more. However, if the content of Mo exceeds 2.0%, the effect of improving the corrosion resistance is saturated. Rather, in this case, the toughness deteriorates. Therefore, the content of Mo is 2.0% or less. From the viewpoint of improvement in the toughness, the content of Mo is preferably 1.5% or less.

Cu: 0.01% or More and 1.0% or Less

Cu is an elemental component effective in improving the corrosion resistance and may be optionally contained. When the content of Cu is 0.01% or more, its effect can be obtained. However, if the content of Cu exceeds 1.0%, its effect is saturated. Rather, in this case, the toughness may deteriorate. Therefore, the content of Cu is 1.0% or less. From the viewpoint of improvement in the toughness, the content of Cu is preferably 0.60% or less. To obtain a sufficient corrosion resistance improving effect, the content of Cu is preferably 0.20% or more.

Co: 0.01% or More and 0.2% or Less

Co is an element that improves the toughness and may be optionally contained. This effect is obtained when Co is contained in an amount of 0.01% or more. However, if the content of Co exceeds 0.2%, the manufacturability of a steel sheet of the present invention may deteriorate. Therefore, when a steel sheet of the present invention contains Co, the content of Co is within the range of 0.01 to 0.2%.

V: 0.01 to 0.10%

V is an element that can improve the workability even when its content is very small and may be optionally contained. When the content of V is 0.01% or more, its effect is obtained. However, if the content of V exceeds 0.10%, the effect of improving the workability is saturated. Therefore, the content of V is 0.10% or less.

Zr: 0.01 to 0.10%

Zr is an element that can improve the workability even when its content is very small and may be optionally contained. When the content of Zr is 0.01% or more, its effect is obtained. However, if the content of Zr exceeds 0.10%, the effect of improving the workability is saturated. Therefore, the content of Zr is 0.10% or less.

B: 0.0002% or More and 0.0050% or Less

B is an element effective in preventing low-temperature secondary work embrittlement and may be optionally contained. To obtain this effect, it is necessary that B be contained in an amount of 0.0002% or more. However, if the content of B exceeds 0.0050%, hot workability may deteriorate. Therefore, when B is contained, its content is 0.0002% or more and 0.0050% or less. From the viewpoint of preventing the low-temperature secondary work embrittlement, the content of B is preferably 0.0005% or more. From the viewpoint of improvement in the hot workability, the content of B is preferably 0.0035% or less and more preferably 0.0020% or less.

Production Method

No particular limitation is imposed on the method for producing a steel sheet in accordance with aspects of the present invention, so long as, when the steel is in a molten state, the compositional components of the molten steel are controlled according to the above description. Any method generally used to produce a ferritic stainless steel sheet can be used without any modification.

Preferred production conditions of the production method will next be described.

Preferably, in a steel making process for producing molten steel, the steel melted in a converter, an electric furnace, etc. is subjected to secondary refining by, for example, a VOD method to thereby obtain steel containing the above-described essential components and components added as needed. The molten steel produced may be formed into a steel raw material (slab) by any well-known method. In terms of productivity and quality, a continuous casting method is used preferably. Then the steel raw material is heated to 1,000 to 1,250° C. and subjected to hot rolling to obtain a hot-rolled sheet with a desired thickness. The thus-obtained hot-rolled sheet may be subjected to continuous annealing at a temperature of 850 to 1,100° C. and then descaled by, for example, pickling to obtain an annealed hot-rolled sheet. No particular limitation is imposed on the cooling speed after the annealing, but it is preferable to finish the cooling in as short a time as possible. If necessary, the scales may be removed by shot blasting before the pickling.

The annealed hot-rolled sheet or hot-rolled sheet described above may be further subjected to a process such as cold rolling to obtain a cold-rolled product. In this case, the cold rolling may be performed only once or may be performed twice or more while process annealing is performed therebetween, in terms of productivity and the required quality. The total rolling reduction after the cold rolling process performed once or at least twice is preferably 60% or more and more preferably 70% or more. Preferably, the cold-rolled steel sheet is then subjected to continuous annealing (finish annealing) at a temperature of preferably 850 to 1,150° C. and more preferably 900 to 1,100° C. and pickled to obtain a cold-rolled product. Also in this case, no particular limitation is imposed on the cooling speed after the annealing, but it is preferable that the cooling speed is as high as possible. For some applications, skin pass rolling etc. may be performed after the finish annealing to control the shape, surface roughness, and quality of the steel sheet.

As for the conditions of plasma arc welding, when butt welding is performed, the following conditions are preferred. Welding current: 50 to 400 A. Voltage: 10 to 40 V. Welding speed: 50 to 600 mm/minute. Constricting nozzle diameter: 1.0 to 5.0 mm. Flow rate of pilot gas (Ar); 0.1 to 5.0 L/minute. Flow rate of shielding gas: 4 to 40 L/minute.

EXAMPLE 1

Examples of the present invention will next be described.

In the Examples, each of cold-rolled sheets used as samples was produced by the following method.

A 50 kg steel ingot having one of the chemical compositions shown in Table 1 was produced using a vacuum melting furnace, heated to 1,200° C., and then subjected to hot rolling using a reversing rolling mill to obtain a 6 mm-thick hot-rolled sheet. The hot-rolled sheet was annealed at 950 to 1,000° C. and then descaled by pickling to thereby obtain an annealed hot-rolled sheet (pickled hot-rolled sheet). Then the annealed hot-rolled sheet was cold-rolled to a thickness of 3.0 mm, subjected to finish annealing at 880 to 970° C., and then descaled by immersing the resulting sheet in mixed acid (10% by mass of nitric acid+3% by mass of hydrogen fluoride) at 60° C. to thereby obtain a cold-rolled sheet.

To examine weldability, each of the samples was subjected to butt welding by the plasma arc welding along a length of 30 cm, which was repeated three times under the following conditions, and the presence or absence of burn-through was checked visually.

The welding conditions (welding conditions A) are as follows.

Plasma arc welding machine manufactured by Fronius
Welding current: 250 A
Welding speed: 260 mm/minute
Distance between a tip and the sheets: 3 mm
Constricting nozzle diameter: 3.2 mm
Pilot gas: Ar, 0.2 L/minute
Shielding gas: Ar, 25 L/minute
Wire: not used Welding was also performed under welding conditions B, which were the same as the above welding conditions A except that the welding current was 270 A.

TABLE 1

| Sample No. | | Chemical composition (unit: % by mass) | | | | | | | | | | | | | | | | | | | (Ti + Nb × 48/93)/(C + N) | Evaluation results |
|---|---|---|---|---|---|---|---|---|---|---|---|---|---|---|---|---|---|---|---|---|---|---|
| | | C | Si | Mn | P | S | Al | Cr | Ni | N | Ca | O | Ti | Nb | Mo | Cu | Co | V | Zr | B | | |
| 1 | Inventive Example | 0.0077 | 0.11 | 0.15 | 0.022 | 0.002 | 0.028 | 17.1 | 0.21 | 0.0101 | 0.0009 | 0.0029 | 0.22 | — | — | — | — | 0.03 | — | — | 12.36 | A |
| 2 | Inventive Example | 0.0091 | 0.08 | 0.43 | 0.039 | 0.001 | 0.031 | 23.5 | 0.33 | 0.0075 | 0.0005 | 0.0035 | 0.30 | — | — | — | — | — | — | — | 18.07 | A |
| 3 | Inventive Example | 0.0086 | 0.09 | 0.17 | 0.028 | 0.001 | 0.025 | 17.0 | 0.25 | 0.0096 | 0.0005 | 0.0027 | 0.25 | — | 0.55 | 0.50 | — | — | — | — | 13.74 | A |
| 4 | Inventive Example | 0.0017 | 0.33 | 0.12 | 0.022 | 0.001 | 0.089 | 20.5 | 0.05 | 0.0068 | 0.0007 | 0.0027 | 0.32 | — | — | — | — | — | — | — | 37.65 | A |
| 5 | Inventive Example | 0.0097 | 0.08 | 0.16 | 0.025 | 0.003 | 0.023 | 17.6 | 0.22 | 0.0087 | 0.0011 | 0.0025 | 0.23 | — | 1.21 | 0.42 | — | 0.02 | — | — | 12.50 | B |
| 6 | Inventive Example | 0.0145 | 0.06 | 0.35 | 0.035 | 0.003 | 0.018 | 21.2 | 0.40 | 0.0055 | 0.0020 | 0.0045 | 0.27 | — | — | — | — | — | — | — | 13.50 | B |
| 7 | Inventive Example | 0.0056 | 0.27 | 0.22 | 0.021 | 0.002 | 0.021 | 18.8 | 0.13 | 0.0089 | 0.0006 | 0.0028 | — | 0.35 | 1.21 | 0.41 | — | 0.04 | — | — | 12.46 | A |
| 8 | Inventive Example | 0.0105 | 0.15 | 0.18 | 0.022 | 0.001 | 0.045 | 21.1 | 0.10 | 0.0122 | 0.0002 | 0.0020 | 0.20 | — | 1.91 | 0.41 | — | 0.04 | — | — | 8.81 | A |
| 9 | Inventive Example | 0.0025 | 0.44 | 0.09 | 0.017 | 0.001 | 0.155 | 21.3 | 0.11 | 0.0141 | 0.0020 | 0.0024 | 0.22 | — | — | — | — | — | — | — | 13.25 | A |
| 10 | Inventive Example | 0.0076 | 0.12 | 0.31 | 0.031 | 0.003 | 0.025 | 21.4 | 0.25 | 0.0112 | 0.0007 | 0.0029 | 0.01 | 0.42 | — | 0.28 | — | — | — | — | 12.06 | A |
| 11 | Inventive Example | 0.0088 | 0.15 | 0.13 | 0.028 | 0.002 | 0.035 | 20.7 | 0.21 | 0.0077 | 0.0013 | 0.0028 | 0.27 | — | 1.21 | — | — | 0.02 | 0.03 | — | 16.36 | A |
| 12 | Inventive Example | 0.0093 | 0.13 | 0.16 | 0.030 | 0.002 | 0.034 | 20.8 | 0.22 | 0.0093 | 0.0009 | 0.0026 | 0.30 | — | 1.86 | — | — | 0.07 | — | — | 16.13 | A |
| 13 | Inventive Example | 0.0111 | 0.07 | 0.14 | 0.027 | 0.003 | 0.031 | 21.5 | 0.24 | 0.0112 | 0.0014 | 0.0027 | 0.38 | — | — | 0.06 | — | 0.04 | — | — | 17.04 | A |
| 14 | Inventive Example | 0.0082 | 0.13 | 0.15 | 0.028 | 0.001 | 0.039 | 20.7 | 0.26 | 0.0095 | 0.0015 | 0.0029 | 0.27 | 0.01 | 0.07 | 0.43 | — | — | — | — | 15.55 | A |
| 15 | Inventive Example | 0.0109 | 0.16 | 0.16 | 0.018 | 0.002 | 0.034 | 20.5 | 0.18 | 0.0113 | 0.0013 | 0.0028 | 0.21 | 0.11 | — | 0.45 | — | 0.05 | — | — | 12.02 | A |
| 16 | Inventive Example | 0.0187 | 0.04 | 0.49 | 0.022 | 0.008 | 0.025 | 23.9 | 0.16 | 0.0110 | 0.0019 | 0.0025 | 0.43 | — | — | 0.68 | — | 0.04 | 0.05 | — | 14.48 | A |
| 17 | Inventive Example | 0.0099 | 0.48 | 0.08 | 0.039 | 0.001 | 0.183 | 21.5 | 0.46 | 0.0193 | 0.0020 | 0.0048 | 0.28 | — | — | 0.96 | — | 0.07 | — | — | 9.59 | B |
| 18 | Inventive Example | 0.0012 | 0.19 | 0.18 | 0.028 | 0.001 | 0.016 | 20.8 | 0.37 | 0.0079 | 0.0003 | 0.0021 | 0.29 | — | — | 0.47 | 0.08 | — | — | 0.0008 | 31.87 | A |
| 19 | Inventive Example | 0.0009 | 0.23 | 0.22 | 0.031 | 0.002 | 0.027 | 17.7 | 0.25 | 0.0073 | 0.0005 | 0.0028 | 0.28 | — | 1.05 | — | 0.15 | — | — | 0.0011 | 34.78 | A |
| 23 | Inventive Example | 0.0091 | 0.14 | 0.18 | 0.029 | 0.002 | 0.035 | 20.8 | 0.13 | 0.0099 | 0.0006 | 0.0028 | 0.30 | 0.01 | — | 0.41 | — | — | — | — | 15.79 | A |
| 24 | Inventive Example | 0.0088 | 0.18 | 0.15 | 0.025 | 0.001 | 0.031 | 20.9 | 0.16 | 0.0089 | 0.0008 | 0.0042 | 0.32 | — | — | 0.44 | — | 0.04 | — | — | 18.08 | B |
| 20 | Comparative Example | 0.0081 | 0.11 | 0.15 | 0.028 | 0.002 | 0.010 | 21.8 | 0.22 | 0.0095 | 0.0011 | 0.0028 | 0.29 | — | — | — | — | — | — | — | 16.48 | C |
| 21 | Comparative Example | 0.0093 | 0.12 | 0.11 | 0.025 | 0.003 | 0.035 | 17.8 | 0.13 | 0.0096 | 0.0001 | 0.0027 | 0.26 | 0.12 | 0.53 | — | — | 0.07 | — | — | 17.03 | C |
| 22 | Comparative Example | 0.0095 | 0.17 | 0.18 | 0.031 | 0.002 | 0.031 | 17.3 | 0.25 | 0.0093 | 0.0009 | 0.0054 | 0.30 | — | 1.22 | — | — | 0.04 | — | — | 15.96 | C |
| 25 | Comparative Example | 0.0078 | 0.19 | 0.14 | 0.028 | 0.001 | 0.012 | 20.7 | 0.13 | 0.0094 | 0.0005 | 0.0027 | 0.32 | — | — | 0.42 | — | — | — | — | 18.60 | C |
| 26 | Comparative Example | 0.0090 | 0.11 | 0.17 | 0.027 | 0.002 | 0.033 | 20.7 | 0.16 | 0.0103 | 0.0001 | 0.0028 | 0.28 | — | — | 0.39 | — | — | — | — | 14.51 | C |
| 27 | Comparative Example | 0.0084 | 0.16 | 0.21 | 0.028 | 0.002 | 0.038 | 20.8 | 0.22 | 0.0091 | 0.0006 | 0.0052 | 0.29 | — | — | 0.40 | — | 0.04 | — | — | 16.57 | C |

<Evaluation Results>

A: No burn-through defect occurred both at welding currents of 270 A and 250 A.

B: A burn-through defect occurred at a welding current of 270 A, but no burn-through defect occurred at a welding current of 250 A.

C: A burn-through defect occurred both at welding currents of 270 A and 250 A.

As is clear from Table 1, even under the same welding conditions, no burn-through occurred in Inventive Examples, but burn-through occurred in Comparative Examples. In each of the Inventive Examples, particularly in each of Nos. 1 to 5, 7 to 16, 18, 19, and 23, since the amount of the O component in the steel sheet was 0.0040% or less, no burn-through occurred under both welding conditions A and welding conditions B, and weldability by plasma arc welding was excellent.

The invention claimed is:

1. A ferritic stainless steel sheet for plasma arc welding, comprising, in mass %, C: 0.020% or less,
Si; 0.6% or less,
Mn; 0.5% or less,
P: 0.04% or less,
S: 0.010% or less,
Al: 0.015% or more and 0.20% or less,
Cr: 17.0% or more and 24.0% or less,
Ni: less than 0.6%,
N: 0.020% or less,
Ca: 0.0002% or more and 0.0020% or less, and
O: 0.0020% or more and 0.0050% or less, and
further comprising one or two selected from Ti: 0.01% or more and 0.45% or less and Nb: 0.01% or more and 0.55% or less,
with the balance being Fe and unavoidable impurities, wherein $$(Ti+Nb \times 48/93)/(C+N) \geq 8.0 \quad (1)$$

is satisfied (in formula (1), Ti Nb, C, and N represent the contents (% by mass) of these elements, respectively).

2. The ferritic stainless steel sheet for plasma arc welding according to claim 1, further comprising, in mass %, one or at least two selected from Mo: 0.01% or more and 2.0% or less,
Cu: 0.01% or more and 1.0% or less and
Co: 0.01% or more and 0.2% or less.

3. The ferritic stainless steel sheet for plasma arc welding according to claim 1, further comprising in mass %, one or at least two selected from V: 0.01% or more and 0.10% or less,
Zr: 0.01% or more and 0.10% or less, and
B: 0.0002% or more and 0.0050% or less.

4. The ferritic stainless steel sheet for plasma arc welding according to claim 1, wherein the ferritic stainless steel sheet is used for keyhole welding.

5. A plasma keyhole welding method in which the ferritic stainless steel sheet for plasma arc welding according to claim 1 is used for plasma keyhole welding.

6. The ferritic stainless steel sheet for plasma arc welding according to claim 2, further comprising, in mass %, one or at least two selected from V: 0.01% or more and 0.10% or less,
Zr: 0.01% or more and 0.10% or less, and
B: 0.0002% or more and 0.0050% or less.

7. The ferritic stainless steel sheet or plasma arc welding according to claim 2, wherein the ferritic stainless steel sheet is used for keyhole welding.

8. The ferritic stainless steel sheet for plasma arc welding according to claim 3, wherein the ferritic stainless steel sheet is used for keyhole welding.

9. The ferritic stainless steel sheet for plasma arc welding according to claim 6, wherein the ferritic stainless steel sheet is used for keyhole welding.

10. A plasma keyhole welding method in which the ferritic stainless steel sheet for plasma arc welding according to claim 2 is used for plasma keyhole welding.

11. A plasma keyhole welding method in which the ferritic stainless steel sheet for plasma arc welding according to claim 3 is used for plasma keyhole welding.

12. A plasma keyhole welding method in which the ferritic stainless steel sheet for plasma arc welding according to claim 6 is used for plasma keyhole welding.

* * * * *